US012008365B2

(12) United States Patent
Moran et al.

(10) Patent No.: US 12,008,365 B2
(45) Date of Patent: Jun. 11, 2024

(54) SYSTEMS AND METHOD FOR AUTOMATED CODE ANALYSIS AND TAGGING

(71) Applicant: JPMORGAN CHASE BANK, N.A., New York, NY (US)

(72) Inventors: Sean Moran, London (GB); Sanat Saha, Mumbai (IN); Gaurav Singh, Mumbai (IN); Fanny Silavong, London (GB); Antonios Georgiadis, London (GB); Ganesh Chandrasekar, London (GB); Andy Alexander, St Albans (GB); Rob Otter, Witham (GB); Brett Sanford, Tunbridge Wells (GB)

(73) Assignee: JPMORGAN CHASE BANK, N.A., New York, NY (US)

(*) Notice: Subject to any disclaimer, the term of this patent is extended or adjusted under 35 U.S.C. 154(b) by 182 days.

(21) Appl. No.: 17/651,005

(22) Filed: Feb. 14, 2022

(65) Prior Publication Data
US 2023/0259359 A1 Aug. 17, 2023

(30) Foreign Application Priority Data
Jun. 28, 2021 (GR) .............................. 20210100433

(51) Int. Cl.
*G06F 8/75* (2018.01)
*G06F 8/41* (2018.01)
*G06F 17/16* (2006.01)

(52) U.S. Cl.
CPC ............. *G06F 8/75* (2013.01); *G06F 8/427* (2013.01); *G06F 17/16* (2013.01)

(58) Field of Classification Search
CPC ............. G06F 8/75; G06F 8/427; G06F 17/16
See application file for complete search history.

(56) References Cited

U.S. PATENT DOCUMENTS

| 2012/0221496 | A1* | 8/2012 | Goyal | G06F 16/35 706/12 |
| 2015/0135166 | A1* | 5/2015 | Tarlow | G06F 11/3604 717/124 |
| 2019/0332968 | A1* | 10/2019 | Fu | G06F 8/30 |
| 2020/0117446 | A1* | 4/2020 | Smith | G06F 9/4451 |
| 2021/0132915 | A1* | 5/2021 | Ivankovic | G06N 20/00 |
| 2021/0326745 | A1* | 10/2021 | Chen | G06N 20/00 |

\* cited by examiner

*Primary Examiner* — Wei Y Zhen
*Assistant Examiner* — Amir Soltanzadeh
(74) *Attorney, Agent, or Firm* — GREENBERG TRAURIG LLP

(57) ABSTRACT

Systems and methods for automated code analysis and tagging are disclosed. In one embodiment, a method for automated code analysis and tagging may include: (1) receiving, by a code annotation computer program executed by a computer processor, a training code snippet from a training codebase; (2) parsing, by the code annotation computer program, the training code snippet into a data structure; (3) quantifying, by the code annotation computer program, the data structure, (4) parsing, by the code annotation computer program, a docstring associated with the training code snippet into a plurality of keywords; (5) quantifying, by the code annotation computer program, the plurality of keywords; and (6) training, by the code annotation computer program, a code annotation model based on a similarity between the quantified data structure and a smoothing parameter for a Dirichlet prior smoothing estimate.

18 Claims, 3 Drawing Sheets

SYSTEMS AND METHOD FOR AUTOMATED CODE ANALYSIS AND TAGGING

RELATED APPLICATIONS

This application claims priority to Greek Patent Application No. 20210100433, filed Jun. 28, 2021, the disclosure of which is hereby incorporated, by reference, in its entirety.

BACKGROUND OF THE INVENTION

1. Field of the Invention

Embodiments relate generally to systems and methods for automated code analysis and tagging.

2. Description of the Related Art

Often, codebases come with no documentation or description of the functionality of each code snippet in the codebase. This makes it difficult to understand the code and to search through the codebase, reducing any efficiencies associated with having such a codebase.

Code documentation models in existence today are generally neural network based, requiring millions of parameters to be trained that require large codebases and expensive equipment, such as graphics processing units (GPUs), etc. Moreover, the training of these large networks can be challenging.

SUMMARY OF THE INVENTION

Systems and methods for automated code analysis and tagging are disclosed. In one embodiment, a method for automated code analysis and tagging may include: (1) receiving, by a code annotation computer program executed by a computer processor, a training code snippet from a training codebase; (2) parsing, by the code annotation computer program, the training code snippet into a data structure; (3) quantifying, by the code annotation computer program, the data structure, (4) parsing, by the code annotation computer program, a docstring associated with the training code snippet into a plurality of keywords; (5) quantifying, by the code annotation computer program, the plurality of keywords; and (6) training, by the code annotation computer program, a code annotation model based on a similarity between the quantified data structure and a smoothing parameter for a Dirichlet prior smoothing estimate.

In one embodiment, wherein the data structure may include an Abstract Syntax Tree ("AST"), a Simplified Parse Tree ("SPT"), etc.

In one embodiment, the data structure may be quantified into a feature vector.

In one embodiment, the method may further include extracting, by the code annotation computer program, structural features for a relationship between two nodes in the data structure.

In one embodiment, the method may further include determining, by the code annotation computer program, a number of occurrences of the keyword in the docstring; comparing, by the code annotation computer program, the number of occurrences of the keyword in the docstring to a number of occurrences of the keyword in the training codebase; and applying, by the code annotation computer program, term frequency inverse document frequency to weight the keyword.

In one embodiment, the step of training the code annotation model based on a similarity between the quantified data structures and the quantified keywords may include: tuning, by the code annotation computer program, a bandwidth of a Gaussian kernel to compute the similarity between the quantified data structures and a smoothing parameter for a Dirichlet prior smoothing estimate.

In one embodiment, the code annotation model may include a probabilistic generative model.

In one embodiment, annotations for the training code snippet may be generated by matrix multiplication of a test code-training code probability matrix and a training code-word probability matrix, wherein the test code-training code probability matrix is computed from a Gaussian kernel density estimate between each test code snippet and each training code snippet.

According to another embodiment, a method for automated code analysis and tagging may include: (1) parsing, by a code annotation computer program executed by a computer processor, an unannotated code snippet into a data structure; (2) quantifying, by the code annotation computer program, the data structure; (3) quantifying, by the code annotation computer program, keywords for a plurality of training code snippets; (4) computing, by the code annotation computer program, conditional probabilities of the unannotated code snippet occurring in each of the plurality of training code snippets; (5) computing, by the code annotation computer program, a conditional probability of each of the keywords in the training code snippets for the unannotated code snippet; (6) selecting, by the code annotation computer program, a plurality of the keywords based on the conditional probability for each keyword; and (7) annotating, by the code annotation computer program, the unannotated code snippet with the selected keywords.

In one embodiment, the data structure may include an Abstract Syntax Tree ("AST"), a Simplified Parse Tree ("SPT"), etc.

In one embodiment, the data structure may be quantified into a feature vector.

In one embodiment, the keywords may be quantified using a Dirchlet prior estimator.

In one embodiment, the conditional probabilities may be computed using a Gaussian kernel density estimator.

In one embodiment, the method may further include computing, by the code annotation computer program, a prior probability of each training code snippet.

In one embodiment, the method may further include determining, by the code annotation computer program, that a prior probability of each training code snippet is constant.

In one embodiment, the step of annotating the unannotated code snippet with the selected keywords may include: storing, by the code annotation computer program, the selected keywords; and associating, by the code annotation computer program, the stored selected keywords with the unannotated code snippet.

In embodiments, methods for automatic code annotation or tagging with natural language keywords or tags by computing and combining a probability distribution computed on software code specific features and a probability distribution computed on natural language keyword features are disclosed. Embodiments may use code and word features, code and word probability distributions based on those features, and a mechanism of combining these distributions to rank keywords in descending order of relevance given held-out code features describing a code snippet to be annotated.

Embodiments provide sparse count features derived from traversal of an Abstract Syntax Tree ("AST") or a Simplified Parse Tree ("SPT") representation of code snippet.

Embodiments may capture information about variable usage, method calls and control structures.

Embodiments may use a truncated Singular Value Decomposition (SVD) applied to sparse features to reduce dimensionality and densify the representation.

Embodiments may use a frequency of word counts of words in the training codebase (e.g., words from normalized and tokenized docstrings associated with code).

Embodiments may define probability distributions from features using a Gaussian kernel between code feature representations and/or a distribution of snippet tag counts and background tag counts, where the background constitutes the words in every snippet across the whole set of repositories under consideration, modelled with a Dirichlet prior, for example, by Dirchlet prior smoothing or smoothed maximum likelihood estimation.

Embodiments may combine the probability distributions to rank tags. For example, embodiments may use a soft counting mechanism defined by the probabilistic equation:

$$P(w, f) = \sum_{J \in T} P(J) \prod_{i=1}^{K} P(w_i|J) \prod_{i=1}^{M} P(f_i|J)$$

In embodiments, keywords that appear in code snippets that have a high similarity to a query code snippet may have a greater likelihood of being keywords for the query code snippet.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Figure 1:
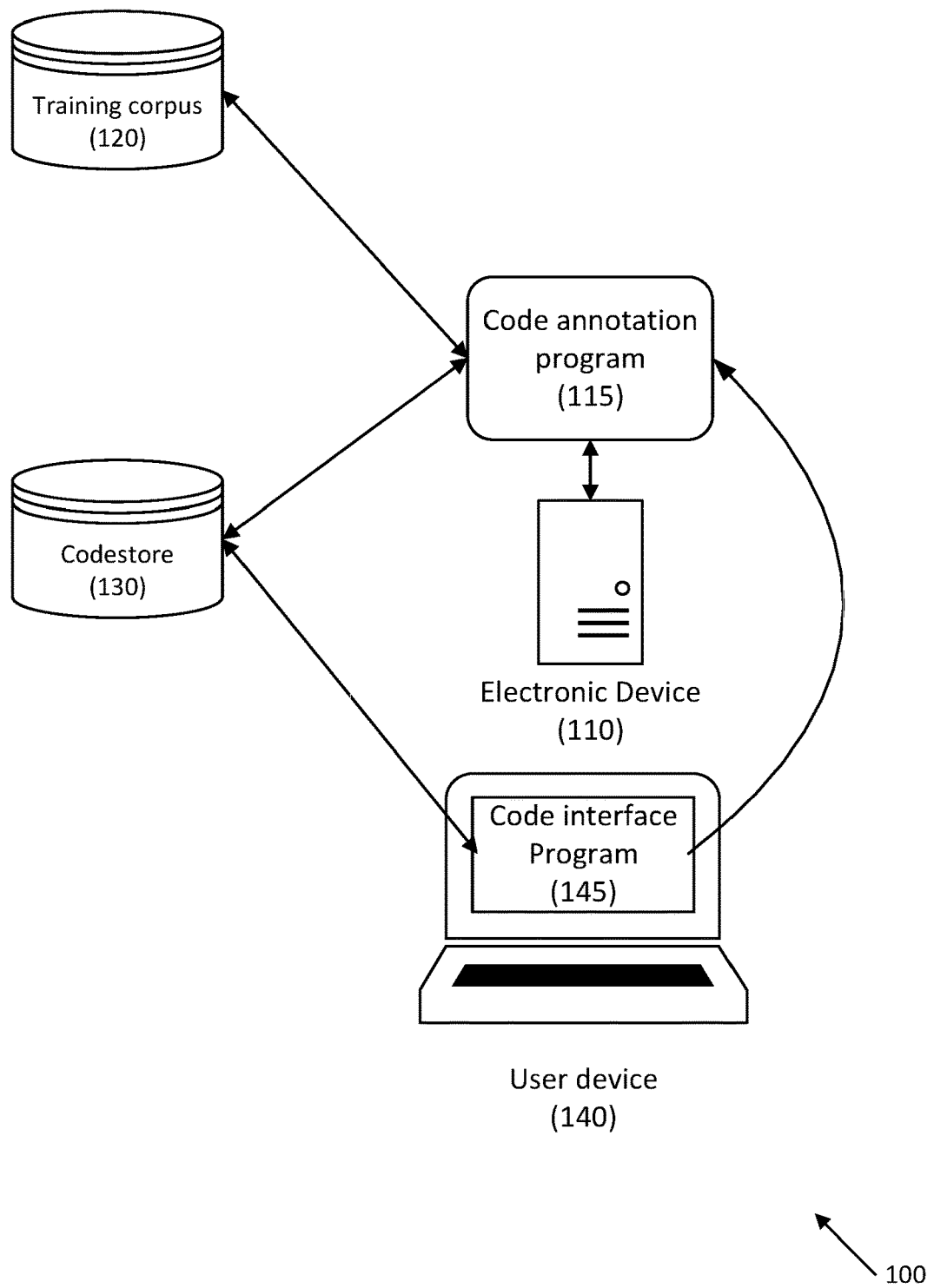
FIG. 1 is a depicts a system for automated code analysis and tagging according to an embodiment.

Embodiments relate generally to systems and methods for automated code analysis and tagging. Embodiments enable more efficient browsing of large codebases, saving developer time through more effective information discovery.

In contrast to existing systems and methods, embodiments require no specialized hardware, is memory based and uses two free parameters that can be tuned to optimize performance on a held-out validation dataset.

Embodiments may assign keywords or tags to code based on the distribution of code features and associated natural language keywords in a training codebase. For example, embodiments may provide: (1) a probabilistic generative model for correlating natural language keywords with programming language code; (2) a mechanism for computing a probability distribution between featurized abstract syntax tree representations of the code snippets; (3) a mechanism for modelling the distribution of keywords in the training codebase; and/or (4) a mechanism for combining the above probability distributions to rank keywords for any given code snippet.

Embodiments may automatically annotate codebases with natural language keywords that model and combine the distribution of code features as defined by a kernel function and the distribution of natural language keywords in the docstring (e.g., arising from an associated docstring). In one embodiment, the code feature vectors may be derived from a structural Abstract Syntax Tree (AST) representation of a code snippet. Any suitable data structure may be used as is necessary and/or desired. Other representations of code could be used to generate feature vectors, for example, using code embeddings derived from a neural network (e.g., Code2Vec).

In one embodiment, the distribution of the natural language keywords may be defined by a Dirichlet prior, for example, by Dirchlet prior smoothing, smoothed maximum likelihood estimation, etc.

Embodiments facilitate the annotation of new code snippets by estimating a probability of the relevance of natural language keywords or tags to each new code snippet. For a given code snippet, those K tags with the highest probability may be selected as the tags to describe the code snippet. Tagging unseen code snippets may be implemented as a single matrix multiplication.

The annotation of unannotated code snippets with keywords enables a search engine to match user-submitted query words to the annotated words on each code snippet, thereby enabling a keyword-based search.

In embodiments, a statistical model may be used to automatically assign words to unlabelled code snippets using a set of N_J training code snippets. The model estimates the joint probability distribution of a set of K words w={w_1 . . . wK} from a vocabulary of size V together with a code snippet represented as a set of feature vectors f={f_1 . . . fM}. The modelling of the joint distribution P(w,f) of tags and code features in this manner enables the annotation of code snippets by searching for those tags that maximize the conditional probability given as:

$$P(w|f) = \frac{P(w, f)}{P(f)}$$

The probability P(w,f) may be computed as joint expectation over the distributions P(.|J) defined by annotated code snippets J in the training set T:

$$P(w, f) = \sum_{J \in T} P(J) \prod_{i=1}^{K} P(w_i|J) \prod_{i=1}^{M} P(f_i|J)$$

where the test code snippet I is denoted as f={f_1, . . . f_M} which is a collection of M feature vectors in which a feature vector could be derived, for example, from the AST of the code snippet being tagged. The M feature vectors need not be computed in the same manner. For example, another one of the M feature vectors representing the code snippet could be computed using the Code2Vec algorithm. J represents the training code snippet which is 1) a collection of R feature vectors, where a feature vector might arise from e.g. from the AST of a code snippet in the training corpus, Code2Vec or any other method for featurizing a code snippet and 2) a collection of keywords associated to the training code snippet.

Referring to FIG. 1, a system for automated code analysis and tagging is disclosed according to an embodiment. System 100 may include electronic device 110, which may be any suitable electronic device, including servers (cloud-based, physical, combinations), workstations, desktop computers, notebook computers, etc.

Electronic device 110 may execute code annotation program 115, annotate snippets of code in codestore 130. In one embodiment, code annotation program 115 may be trained using training corpus 120, which may include annotated code snippets.

In one embodiment, code annotation program 115 may parse each code snippets in training corpus 120 into a data structure, such as an AST, and may identify keywords in the docstring(s) for the code snippets. Any suitable mechanism for generating the data structures may be used as is necessary and/or desired.

Code annotation program 115 may further quantify the data structure by converting the data structure into a numeric vector. Any suitable quantification mechanism may be used as is necessary and/or desired.

User device 140 may be provided to search codestore 130. User device 140 may be any suitable electronic device, including servers, workstations, desktop computers, notebook computers, laptop computers, smart devices (e.g., smartphones, etc.). In one embodiment, user device 140 may execute code interface program 145 that may facilitate searching code in codestore 130 using, for example, keywords. Interface program 145 may be a web interface with a text entry field that accepts keywords to search for in the code repository.

In one embodiment, once it is annotated, the annotated code may be used to enrich an existing codebase of annotated code (i.e., the training dataset). A feedback loop where a user may correct automated annotations may be provided as is necessary and/or desired.

Figure 2:
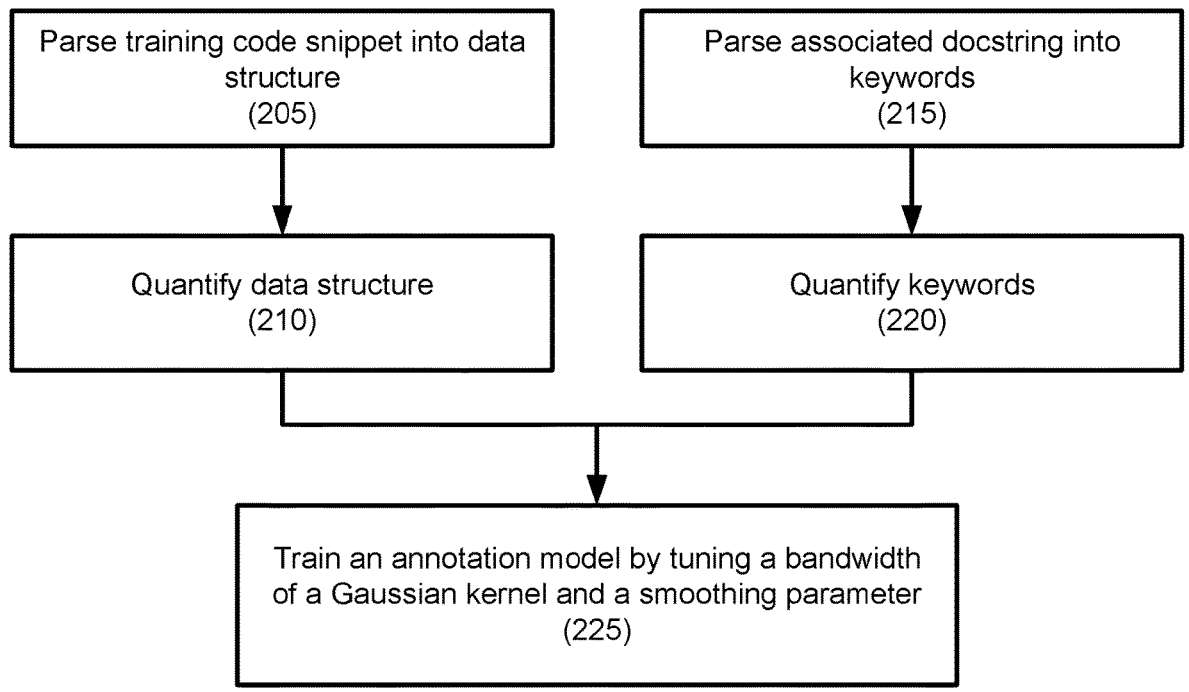
FIG. 2 depicts a method for automated code analysis and tagging according to an embodiment.

Referring to FIG. 2, a method for automated code analysis and tagging is disclosed according to an embodiment. FIG. 2 depicts a training process for training a code annotation program to associate relevant keywords from docstrings with code snippets.

In step 205, a code annotation program may retrieve a code snippet from a training codebase and may parse the code snippet into a data structure, such as an AST or a SPT. In one embodiment, if not already in code snippets, the code annotation program may parse code into a plurality of snippets.

Any suitable mechanism for generating the data structure may be used as is necessary and/or desired. For example, an AST may be generated by using a source code parser program, such as ANTLR ("ANother Tool for Language Recognition"). ANTLR is a parser generator for reading, processing, executing, or translating structured text or binary files. ANTLR is used to generate Parse Trees, such as ASTs. A SPT may be generated from an AST tree through abstraction and generalization to remove any finer grained detail from the AST representation that is not needed or will negatively impact the similarity computation between code examples. Embodiments may focus on keyword tokens and not non-keyword tokens (e.g., variable names, method names, field names, literals, etc.) or program-specific tokens. This means that the representation can be applied across programming languages.

In one embodiment, the non-keyword tokens and sub-trees in the AST may be replaced with a character, such as "#". For example. if "z" is a non-keyword token but "return" is a keyword token, "z" may be replaced with "#" while "return" is retained as it is. Additionally, the value at each internal node may be obtained by concatenating the elements of the sub-tree. For example if "x", "+", and "y" represent the leaf nodes, "x" and "y" may be replaced with "#" since they are variable names. The resulting value at its parent node is "#+#".

The SPT representation is an example of a code sketch, a way of representing code that focuses on the coarse level details and abstracts out more finely grained information that would negatively affect the generalization of the representation across different programs.

In step 210, the code annotation program may quantify the data structure. In one embodiment, the code annotation program may convert the data structure for the code snippet into a numerical feature vector, such as a binary vector. Any suitable mechanism for quantifying the data structure may be used as is necessary and/or desired. For example, features from the information present in the AST may be extracted into a code annotation model. Given two similar code snippets, there should be a significant overlap between the two sets of features.

Structural features that capture the relationship between different internal nodes may be extracted from the tree. For example, several types of features can be extracted by traversing the AST or SPT, including token features, which are the value of the internal nodes present in the AST or SPT; parent features, such as the relationships between a node and its parent node and its grandparent node; sibling features, such as the relationship of every internal node to its sibling nodes; variable usage features, such as the different contexts in which the variable has been used; etc. The set of unique features captured this way from all ASTs or SPTs in a training codebase are the "vocabulary" for the training codebase. For each code snippet in the training codebase, a binary vector may be generated from the AST or SPT by comparing the features present in the AST or SPT to the features in the vocabulary. For the features that are present in the vocabulary, a first value, such as "1" may be assigned when the feature is present, and a second value, such as "0," may be assigned when the feature is absent. This results in a binary vector for every AST or SPT in the codebase.

In step 215, the code annotation program may parse the associated docstring for the code snippet into keywords. For example, the code annotation program may identify keywords in the docstring for the code snippet. In one embodiment, the code annotation program may apply natural language processing (NLP) to refine the keywords to those that are most relevant, including filtering stop words, tokenization, stemming, lemmatization, etc.

In step 220, the code annotation program may quantify the keywords. In one embodiment, the occurrence of the keywords may be counted in both the docstring associated with a code snippet and in all docstrings in the training dataset. In one embodiment, the keywords may be weighted by term frequency inverse document frequency (TF-IDF), or in another embodiment, the count, or term frequency, of the keywords in the docstring may be used.

In embodiments, quantification for words may be a two-step process: First, a subset of keywords may be selected for each snippet. There may be noisy or less useful keywords on each snippet, and embodiments may filter those keywords. Thus, TF-IDF may be used to select a set of the most discriminative keywords. It does this by combining two terms: term frequency (TF), the count of the keyword in the snippet. Inverse document frequency (IDF) computes a measure of how often the keyword occurs across all snippets in the repositories. A small IDF means that the word is less likely to be relevant, as the small IDF indicates that the word occurs frequently in the other snippets and is therefore not likely to be informative in describing the current snippet. A large IDF means that the word is more likely to be relevant, as the large IDF indicates that the word does not occur frequently in the other snippets. This can be taken as an indicator that the word is important for describing the current snippet.

Next, the probabilities to be use for annotation may be computed. For example, the Dirichlet prior smoothing estimate may be applied to the filtered keywords.

In step 225, the code annotation program may train a code annotation model. In one embodiment, the code annotation program may tune the bandwidth of a Gaussian kernel that computes the similarity between the featurized ASTs or SPTs (i.e., the ASTs or SPTs that have been transformed into a numerical vector representation) and a smoothing parameter for the Dirichlet prior smoothing estimate. In one embodiment, the code annotation model may be a probabilistic generative model.

The tokenization and extraction of deterministic keywords may be performed as a pre-processing step before model training. The keywords may be ranked, such as by TF-IDF, to identify a good set of discriminative keywords. In one embodiment, annotations for test snippets may be generated by the matrix multiplication of S_hat by W of the test code-train code probability matrix and the train code-word probability matrix W. The test code-train code probability matrix may be given by computing, for example, Gaussian kernel density estimate between a feature vector f_i representing the test code snippet and a compatible feature vector from the R feature vectors representing the training code snippet P(f|J):

$$P(f_i|J) = \frac{1}{R}\sum_{j=1}^{R} P(f_i|f_j)$$

Where R is the number of feature vectors representing the training code snippet J={f_1 ... f_R} and M is the number of feature vectors for the test code snippet I={f_1, ... f_M}. Each feature vector results from a different data structure quantification process.

For example, f_1 may result from the AST to SPT quantification process, f_2 could result from a Code2Vec quantification process. A kernel function can only be applied between compatible feature vectors i.e. feature vectors resulting from the same quantification process. The kernel function between compatible feature vectors i.e. feature vectors resulting from the same quantification process must be the same kernel function which could be any valid kernel function e.g. Gaussian, Laplacian, Generalized Gaussian. The kernel functions may be, but need not be, different for features arising from different data structure quantification processes e.g. Gaussian kernel for SPT features, Laplacian kernel for Code2Vec features etc. For example, the Gaussian kernel density estimate between any two feature vectors arising from the same data structure quantification process (e.g. SPT featurization) may be given by the following equation which is computed between a feature vector representing the test code snippet and a feature vector representing the training code snippet:

$$P(f_i|f_j) = \frac{1}{\sqrt{2^d \pi^d \beta}} \exp\left\{\frac{-\|f_i - f_j\|^2}{\beta}\right\}$$

Where $\beta$ is a kernel bandwidth parameter, S_hat may be computed as given below, where S is the matrix consisting of the logarithm of the test code-train code probabilities log(P(I,J)) and Z is a normalization vector in logarithm space.

$$Z_{ij} = \log\left\{\sum_{J \in T} \exp\{\log(P(I|J))\}\right\}$$

$$\hat{S} = \exp\{S - \{Z \times 1_{1 \times N_J}\}\}$$

In the above equation P(I|J) is given by $$\prod_{i=1}^{M} P(f_i|J).$$

The train code-word probability matrix may be obtained by computing, for example, the Dirichlet prior smoothing estimate P(w|J) for each word in every training code snippet as given by the equation below:

$$P(w_i|J) = \frac{\mu p_v + N_{v,J}}{\mu + \sum_{v'} N_{v',J}}$$

Here, $N_{v,J}$ is the number of times the keyword v appears in the docstring of code snippet J, $P^v$ is the relative frequency that the word v appears in the training dataset, μ and is a smoothing parameter.

Figure 3:
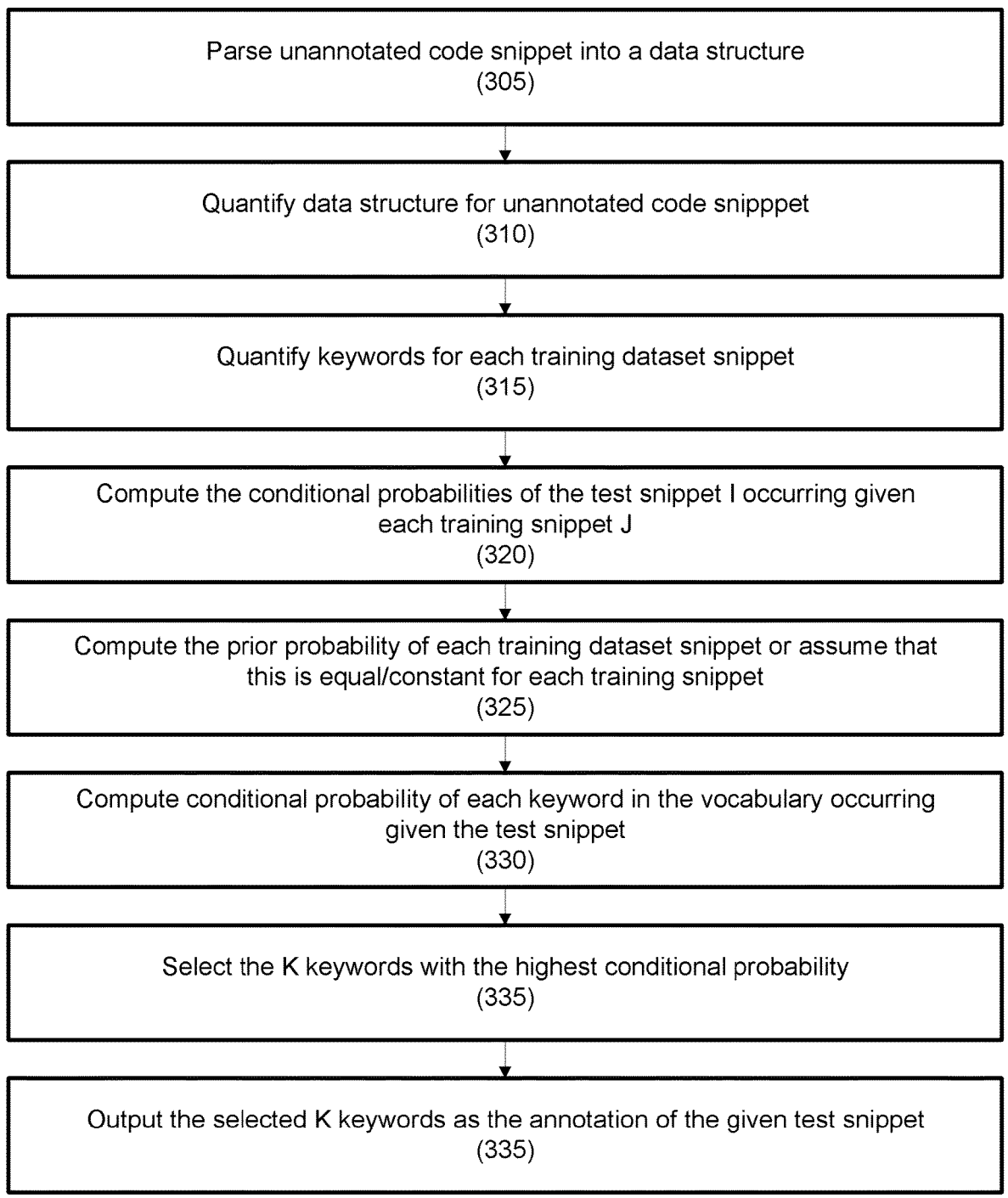
FIG. 3 depicts a method for automated code analysis and tagging according to another embodiment.

Referring to FIG. 3, a method for automated code analysis and tagging is disclosed according to an embodiment. FIG. 3 depicts an automated code annotation process using the trained annotation model of FIG. 2.

In step 305, the code annotation program may retrieve an unannotated code snippet from a codestore and may parse the unannotated code snippet into a data structure, such as an AST or a SPT. This may be similar to step 205, above.

In step 310, the code annotation program may quantify the data structure for the unannotated code snippet. For example, the code annotation program may compute AST and/or SPT feature vectors for the code snippet. This may be similar to step 210, above.

In step 315, the code annotation program may quantify keywords for each training dataset snippet. In one embodiment, the code annotation program may compute P(w|J) for each J. For example, P(w|J) may be computed using the Dirchlet prior estimator discussed above.

In step 320, the code annotation program may compute conditional probabilities (P(f|J)) of the test snippet f for each training code snippet J. In one embodiment, the code annotation program may compute the conditional probability P(f|J) using the Gaussian kernel estimator P(f|J) with the optimal kernel bandwidth discussed above.

In step 325, the code annotation program may compute the prior probability P(J) of each training dataset snippet. In another embodiment, the code annotation program may assume that the prior probability P(J) is equal or constant for each training snippet.

In step 330, the code annotation program may compute the conditional probability of each keyword in the vocabulary given the test snippet. In one embodiment, the code annotation program may calculate P(w|f) for every w in the vocabulary. The conditional probability may be calculated using the equation:

$$P(w|f) = \frac{P(w, f)}{P(f)}$$

The numerator (P(w,f)) may be calculated using the following equation:

$$P(w, f) = \sum_{J \in T} P(J) \prod_{i=1}^{K} P(w_i|J) \prod_{i=1}^{M} P(f_i|J)$$

where the test code snippet I is denoted as f={f_1, ... f_M} which is a collection of M feature vectors in which a feature vector could be derived, for example, from the AST of the code snippet being tagged. The M feature vectors need not be computed in the same way. For example another one of the M feature vectors could be a Code2Vec feature vector representing the code snippet. J represents the training code snippet which is 1) a collection of R feature vectors, where a feature vector might arise from e.g. from the AST of a code snippet in the training corpus or Code2Vec and 2) a collection of keywords associated to the training code snippet. For a given word, for each training dataset data structure, the probability of a the test data structure (i.e., the AST) occurring given the training data structure (i.e., the AST) ($\Pi_{i=1}^{M} P(\vec{f}_i|J)$) may be multiplied by the probability of the given word being associated to the training data structure (P(w_i|J)). The resulting probability may be multiplied by the prior (background) probability of the training code snippet occurring in the training dataset (P(J)). This computation may be repeated for each training dataset structure (J∈T) to give N probabilities, where N is the number of training dataset structures.

In one embodiment, the N probabilities may be summed ($\Sigma_{J \in T} P(J) P(w_i|J) \Pi_{i=1}^{M} P(\vec{f}_i|J)$) to give the aggregated probability of relevance of that word being associated with the test data structure (P(w_i,f)). This probability may be normalized to obtain the conditional probability (P(w,f)).

In step 335, the code annotation program may select the K keywords with the highest conditional probabilities. Any suitable number of K keywords may be selected as is necessary and/or desired. In one embodiment, the keywords that have a conditional probability above a certain threshold probability may be selected. In another embodiment, the keywords may be sorted using a descending probability, and a certain number (e.g., the top 5, 10, 20, etc.) of the sorted keywords may be selected. The number K may be selected as is necessary and/or desired.

Any suitable manner of selecting the number of K keywords may be used as is necessary and/or desired.

In step 340, the code annotation program may output the selected K keywords as the annotation of the given test snippet. The K keywords may be added as a docstring associated with the code snippet, may be stored in a separate location and associated with the code snippet, combinations thereof, etc.

Although multiple embodiments have been described, it should be recognized that these embodiments are not exclusive to each other, and that features from one embodiment may be used with others.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated code analysis and tagging, comprising:
    receiving, by a code annotation computer program executed by a computer processor, a training code snippet from a training codebase;
    parsing, by the code annotation computer program, the training code snippet into a data structure;
    quantifying, by the code annotation computer program, the data structure,
    parsing, by the code annotation computer program, a docstring associated with the training code snippet into a plurality of keywords;
    quantifying, by the code annotation computer program, the plurality of keywords;
    training, by the code annotation computer program, a code annotation model based on a similarity between the quantified data structure and a smoothing parameter for a Dirichlet prior smoothing estimate; and
    generating an annotation for the training code snippet by matrix multiplication of a test code-training probability matrix and a training code-word probability matrix, the test code-training code probability matrix computed from a Gaussian kernel density estimate between each test code snippet and each training code snippet from the training codebase.

2. The method of claim 1, wherein the data structure comprises an Abstract Syntax Tree ("AST").

3. The method of claim 1, wherein the data structure comprises a Simplified Parse Tree ("SPT").

4. The method of claim 1, wherein the data structure is quantified into a feature vector.

5. The method of claim 1, further comprising:
    extracting, by the code annotation computer program, structural features for a relationship between two nodes in the data structure.

6. The method of claim 1, further comprising:
    determining, by the code annotation computer program, a number of occurrences of the keyword in the docstring;
    comparing, by the code annotation computer program, the number of occurrences of the keyword in the docstring to a number of occurrences of the keyword in the training codebase; and
    applying, by the code annotation computer program, term frequency inverse document frequency to weight the keyword.

7. The method of claim 1, wherein the step of training the code annotation model based on a similarity between the quantified data structures and the quantified keywords comprises:
    tuning, by the code annotation computer program, a bandwidth of a Gaussian kernel to compute the similarity between the quantified data structures and a smoothing parameter for a Dirichlet prior smoothing estimate.

8. The method of claim 1, wherein the code annotation model comprises a probabilistic generative model.

9. A method for automated code analysis and tagging, comprising:
    receiving, by a code annotation computer program executed by a computer processor, a training code snippet from a training codebase;
    parsing, by the code annotation computer program, the training code snippet into a data structure;
    quantifying, by the code annotation computer program, the data structure,
    parsing, by the code annotation computer program, a docstring associated with the training code snippet into a plurality of keywords;
    quantifying, by the code annotation computer program, the plurality of keywords; and
    tuning, by the code annotation computer program, a bandwidth of a Gaussian kernel to compute a similarity between the quantified data structures and a smoothing parameter for a Dirichlet prior smoothing estimate,
    wherein annotations for the training code snippet is generated by matrix multiplication of a test code-training code probability matrix and a training code-word probability matrix, wherein the test code-training code probability matrix is computed from a Gaussian kernel density estimate between each test code snippet and each training code snippet.

10. A method for automated code analysis and tagging, comprising:
    parsing, by a code annotation computer program executed by a computer processor, an unannotated code snippet into a data structure;
    quantifying, by the code annotation computer program, the data structure;
    quantifying, by the code annotation computer program, keywords for a plurality of training code snippets by matrix multiplication of a test code-training code probability matrix and a training code-word probability matrix, wherein the test code-training code probability matrix is computed from a Gaussian kernel density estimate between each test code snippet and each of the plurality of training code snippets;
    computing, by the code annotation computer program, conditional probabilities of the unannotated code snippet occurring in each of the plurality of training code snippets;
    computing, by the code annotation computer program, a conditional probability of each of the keywords in the training code snippets for the unannotated code snippet;
    selecting, by the code annotation computer program, a plurality of the keywords based on the conditional probability for each keyword; and
    annotating, by the code annotation computer program, the unannotated code snippet with the selected keywords.

11. The method of claim 10, wherein the data structure comprises an Abstract Syntax Tree ("AST").

12. The method of claim 10, wherein the data structure comprises a Simplified Parse Tree ("SPT").

13. The method of claim 10, wherein the data structure is quantified into a feature vector.

14. The method of claim 10, wherein the keywords are quantified using a Dirchlet prior estimator.

15. The method of claim 10, wherein the conditional probabilities are computed using a Gaussian kernel density estimator.

16. The method of claim 10, further comprising:
    computing, by the code annotation computer program, a prior probability of each training code snippet.

17. The method of claim 10, further comprising:
 determining, by the code annotation computer program, that a prior probability of each training code snippet is constant.

18. The method of claim 10, wherein the step of annotating the unannotated code snippet with the selected keywords comprises:
 storing, by the code annotation computer program, the selected keywords; and
 associating, by the code annotation computer program, the stored selected keywords with the unannotated code snippet.

\* \* \* \* \*